United States Patent
Kim

(10) Patent No.: US 11,288,357 B2
(45) Date of Patent: Mar. 29, 2022

(54) APPARATUS AND METHOD FOR AUTHENTICATING CALLER IN COMMUNICATION SYSTEM

(71) Applicant: Samsung Electronics Co., Ltd., Suwon-si (KR)

(72) Inventor: Hyeongseon Kim, Seongnam-si (KR)

(73) Assignee: Samsung Electronics Co., Ltd., Suwon-si (KR)

(\*) Notice: Subject to any disclaimer, the term of this patent is extended or adjusted under 35 U.S.C. 154(b) by 216 days.

(21) Appl. No.: 16/348,032

(22) PCT Filed: Nov. 1, 2017

(86) PCT No.: PCT/KR2017/012206
§ 371 (c)(1),
(2) Date: May 7, 2019

(87) PCT Pub. No.: WO2018/084548
PCT Pub. Date: May 11, 2018

(65) Prior Publication Data
US 2019/0311107 A1    Oct. 10, 2019

(30) Foreign Application Priority Data
Nov. 7, 2016 (KR) .......................... 10-2016-0147515

(51) Int. Cl.
*G06F 21/42* (2013.01)
*H04L 9/30* (2006.01)
(Continued)

(52) U.S. Cl.
CPC ............... *G06F 21/42* (2013.01); *H04L 9/30* (2013.01); *H04L 9/32* (2013.01); *H04L 9/3247* (2013.01);
(Continued)

(58) Field of Classification Search
CPC ....... G06F 21/42–43; H04L 9/30; H04L 9/32; H04L 9/321–3213; H04L 9/3234;
(Continued)

(56) References Cited

U.S. PATENT DOCUMENTS 6,324,271 B1* 11/2001 Sawyer .................. H04M 1/57
379/142.04
6,600,734 B1   7/2003 Gernert et al.
(Continued)

FOREIGN PATENT DOCUMENTS

| JP | 2009-105824 A | 5/2009 |
| JP | 2012-039245 A | 2/2012 |

(Continued)

OTHER PUBLICATIONS

European Office Action dated Nov. 19, 2020, issued in European Application No. 17867702.7.
(Continued)

*Primary Examiner* — Kevin Bechtel
(74) *Attorney, Agent, or Firm* — Jefferson IP Law, LLP

(57) ABSTRACT

The present disclosure relates to an apparatus and a method for authenticating a caller in a communication system. An operating method of a terminal for authenticating a caller may comprise the steps of: generating an identifier and information corresponding to the identifier, on the basis of an identification number related to the terminal and an identification number related to another terminal; generating a digital signature for the information; encrypting the information; and transmitting, to a server, a message including the identifier, the digital signature, and the encrypted information.

12 Claims, 13 Drawing Sheets

(51) Int. Cl.
  *H04L 9/32* (2006.01)
  *H04L 65/1076* (2022.01)
  *H04L 29/06* (2006.01)
  *H04M 3/436* (2006.01)
  *G06Q 20/38* (2012.01)

(52) U.S. Cl.
  CPC ...... *H04L 63/0823* (2013.01); *H04L 65/1076* (2013.01); *H04M 3/436* (2013.01); *G06Q 20/38* (2013.01)

(58) Field of Classification Search
  CPC ......... H04L 9/3247–3257; H04L 63/08; H04L 63/0823; H04L 63/0853; H04L 63/0876; H04L 63/0892; H04L 65/1076; H04M 3/436–4365
  See application file for complete search history.

(56) References Cited

U.S. PATENT DOCUMENTS

| | | | |
|---|---|---|---|
| 6,678,265 B1 | 1/2004 | Kung et al. | |
| 6,680,935 B1 | 1/2004 | Kung et al. | |
| 9,277,049 B1 * | 3/2016 | Danis | H04M 3/54 |
| 2003/0135740 A1 | 7/2003 | Talmor et al. | |
| 2003/0193946 A1 | 10/2003 | Gernert et al. | |
| 2004/0003070 A1 | 1/2004 | Fernald et al. | |
| 2004/0214597 A1 | 10/2004 | Suryanarayana et al. | |
| 2004/0229597 A1 | 11/2004 | Patel | |
| 2006/0046689 A1 | 3/2006 | Kim | |
| 2006/0047970 A1 | 3/2006 | Mochizuki | |
| 2006/0120345 A1 | 6/2006 | Sung et al. | |
| 2006/0248229 A1 | 11/2006 | Saunderson et al. | |
| 2006/0293850 A1 | 12/2006 | Ahn et al. | |
| 2007/0115940 A1 | 5/2007 | Kamen et al. | |
| 2007/0130025 A1 | 6/2007 | Nakajima | |
| 2007/0258439 A1 | 11/2007 | Chu | |
| 2007/0274293 A1 | 11/2007 | Forbes | |
| 2008/0089494 A1 | 4/2008 | Kaas et al. | |
| 2009/0300178 A1 | 12/2009 | Saunderson et al. | |
| 2010/0165981 A1 | 7/2010 | Kuppuswamy et al. | |
| 2011/0231574 A1 | 9/2011 | Saunderson et al. | |
| 2012/0144198 A1 | 6/2012 | Har et al. | |
| 2013/0109355 A1 | 5/2013 | Cope et al. | |
| 2013/0205329 A1 | 8/2013 | Markley et al. | |
| 2014/0059644 A1 | 2/2014 | Shin et al. | |
| 2015/0281191 A1 | 10/2015 | Mardikar | |
| 2016/0065570 A1 | 3/2016 | Spencer, III et al. | |
| 2016/0134751 A1 | 5/2016 | Li | |

FOREIGN PATENT DOCUMENTS

| | | |
|---|---|---|
| KR | 10-2008-0086236 A | 9/2008 |
| KR | 10-2016-0126940 A | 11/2016 |

OTHER PUBLICATIONS

Extended European Search Report dated Jul. 8, 2019, issued in European Application No. 17867702.7.

* cited by examiner

APPARATUS AND METHOD FOR AUTHENTICATING CALLER IN COMMUNICATION SYSTEM

TECHNICAL FIELD

The present disclosure relates generally to an apparatus and a method for authenticating a user in a communication system, and more specifically, relates to an apparatus and a method for authenticating a caller of a call.

BACKGROUND ART

A public key infrastructure (PKI) scheme which is an authentication technology mostly used in Internet banking indicates a digital signature technology using a pair of a private key and a public key based on a certificate. Herein, the private key, which is a key owned by an individual, is used to authenticate content by digital signing a message transmitted by an owner of the private key. Also, the private key may be referred to as a secret key. By contrast, the public key is posted in a public storage, and is certified by a digital signature of an authentication management server which is referred to as a certificate authority (CA). In addition, the public key is used to encrypt corresponding content such that only the owner of the private key may identify the message transmitted to the owner of the private key.

As such, the PKI scheme using the private key and the public key is used in not only the Internet banking but also voice over Internet protocol (VoIP) which is a call service based on the Internet network. In this case, it is assumed that all servers which function as a caller, a callee, and an intermediate node use the same VoIP protocol based on the Internet, and accordingly, a call setup message is authenticated through the digital signature. That is, there is a profile document for suggesting the authentication based on the PIK scheme in the VoIP, but the profile document may be applied only if every entity uses the same VoIP protocol on the Internet. Herein, the VoIP protocol may include H.323 protocol, session initiation protocol (SIP), media gateway control protocol (MGCP), media gateway control (Megaco) protocol, and so on.

DISCLOSURE OF INVENTION

Technical Problem

Based on the discussions as above, the present disclosure provides an apparatus and a method for authenticating a caller through authentication based on a public key infrastructure (PKI) scheme in a communication system.

Also, the present disclosure provides an apparatus and a method for authenticating a caller between callers who use different interfaces or protocols in a communication system.

Also, the present disclosure provides an apparatus and a method for authenticating a caller using an outgoing number and an incoming number in a communication system.

Also, the present disclosure provides an apparatus and a method for authenticating a caller based on encryption and digital signature using a public key and a private key in a communication system.

Also, the present disclosure provides an apparatus and a method for transmitting and receiving security data using an authentication procedure based on an outgoing number and an incoming number in a communication system.

Also, the present disclosure provides an apparatus and a method for performing a payment procedure using an authentication procedure based on an outgoing number and an incoming number in a communication system.

Solution to Problem

According to various embodiments of the present disclosure, an operating method of a terminal in a communication system may include generating an identifier and information corresponding to the identifier based on an identification number regarding the terminal and an identification number regarding another terminal, generating a digital signature for the information, encrypting the information, and transmitting to a server a message including the identifier, the digital signature, and the encrypted information.

According to various embodiments of the present disclosure, an operating method of a terminal in a communication system may include generating an identifier based on an identification number regarding the terminal and an identification number regarding another terminal, transmitting a message for requesting information corresponding to the generated identifier to a server, receiving the information from the server, and displaying the received information.

According to various embodiments of the present disclosure, an operating method of a server in a communication system may include receiving from a terminal a message including encrypted information and a digital signature, decrypting the information, identifying the digital signature, and transmitting a message including the decrypted information and the digital signature to another terminal.

According to various embodiments of the present disclosure, a terminal in a communication system may include a controller for generating an identifier and information corresponding to the identifier based on an identification number regarding the terminal and an identification number regarding another terminal, generating a digital signature for the information, and encrypting the information, and a communication unit for transmitting to a server a message including the identifier, the digital signature, and the encrypted information.

According to various embodiments of the present disclosure, a terminal in a communication system may include a controller for generating an identifier based on an identification number regarding the terminal and an identification number regarding another terminal, and a communication unit for transmitting a message for requesting information corresponding to the generated identifier to a server, and receiving the information from the server, and the controller may further display the received information.

According to various embodiments of the present disclosure, a server in a communication system may include a communication unit for receiving from a terminal a message including encrypted information and a digital signature, and a controller for decrypting the information and identifying the digital signature, and the communication unit may further transmit a message including the decrypted information and the digital signature to another terminal.

Advantageous Effects of Invention

An apparatus and a method according to various embodiments of the present disclosure may effectively authenticate a caller, based on an authentication procedure using a tag for a combination of an outgoing number and an incoming number.

In addition, an apparatus and a method according to various embodiments of the present disclosure may address social issues such as voice phishing, by effectively authenticating a caller of a call originated from a major government office and a financial institution.

Effects obtainable from the present disclosure are not limited to the above mentioned effects, and other effects which are not mentioned may be clearly understood by those skilled in the art of the present disclosure through the following descriptions.

BEST MODE FOR CARRYING OUT THE INVENTION

Figure 1:
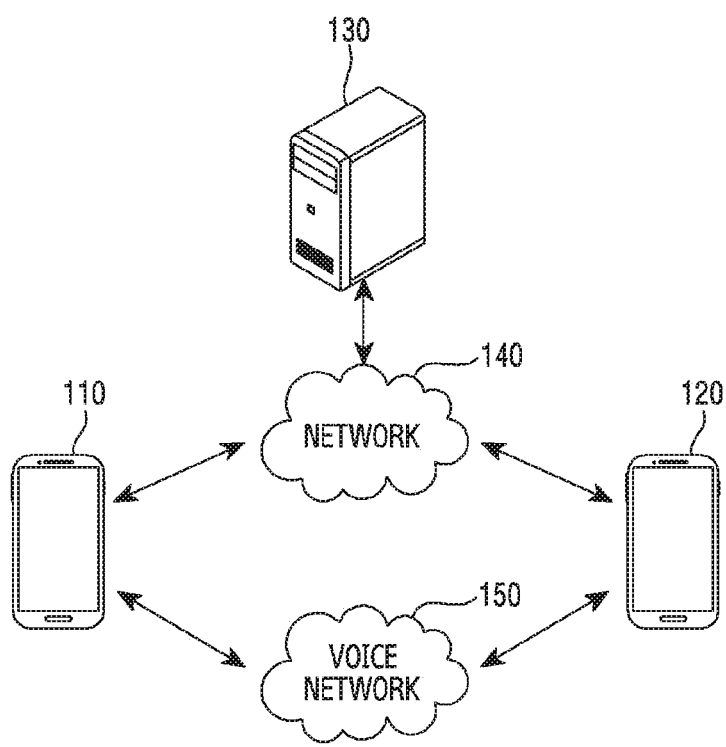
FIG. 1 illustrates an example of a caller authentication system according to various embodiments of the present disclosure.

The terms used in the present disclosure are only used to describe specific embodiments, and are not intended to limit other embodiments. Singular expressions may include plural expressions as well unless the context clearly indicates otherwise. All terms used herein, including technical and scientific terms, may have the same meaning as those commonly understood by a person skilled in the art to which the present disclosure pertains. Terms defined in a generally used dictionary among the terms used in the present disclosure may be interpreted to have the meanings equal or similar to the contextual meanings in the relevant field of art, and are not to be interpreted to have ideal or excessively formal meanings unless clearly defined in the present disclosure. In some cases, even a term defined in the present disclosure should not be interpreted to exclude embodiments of the present disclosure.

In various embodiments of the present disclosure to be described below, a hardware approach will be described as an example. However, since the various embodiments of the present disclosure include a technology using both hardware and software, the various embodiments of the present disclosure do not exclude a software-based approach.

The present disclosure relates to an apparatus and a method for encrypting, decrypting, digital singing, and transmitting and receiving information identified by a tag for an identification number of a caller and an incoming number of a callee, to authenticate the caller.

Terms (e.g., tag) indicating information used for the authentication used in the present disclosure, terms indicating control information, terms indicating network entities, terms indicating messages, and terms indicating components of an apparatus are for the sake of explanations. Accordingly, the present disclosure is not limited to the terms to be described, and other terms having technically identical meaning may be applied to the present disclosure.

In voice over Internet protocol (VoIP) which is a call service based on Internet network, a profile document for the authentication based on public key infrastructure (PKI) is suggested. The profile document includes content for digital signing and authenticating a call setup message, assuming that all servers which function as a caller, a callee, and an intermediate node use the same VoIP protocol based on the Internet. For example, data packets transmitted and received for calls on the Internet may be authenticated by a digital signature. Herein, the digital signature may indicate information or a data stream for authenticating information generated by a specific person or institution.

As stated above, while the VoIP includes the profile document for suggesting the PKI based authentication, it is feasible only if every entity uses the same VoIP protocol on the Internet. Hence, the authentication procedure using the profile document may not be applied if an analog telephone network (e.g., public switched telephone network (PSTN)) and an Internet telephone network (e.g., VoIP) coexist or VoIP protocols coexist.

Thus, the present disclosure provides an apparatus and a method for authenticating a caller using a tag for an incoming number and an outgoing number and the PKI based authentication procedure, even if an existing telephone network and the Internet telephone network coexist or the VoIP protocols coexist in the same Internet network.

FIG. 1 illustrates an example of a caller authentication system according to various embodiments of the present disclosure. Referring to FIG. 1, the system may include a caller terminal 110, a callee terminal 120, a server 130, a network 140, and a voice network 150.

The caller terminal 110 may indicate a device used by a caller, or another device connected with the device used by the user. In various embodiments, the caller terminal 110 may indicate a device including an originating module which is a module on the caller. Herein, the originating module may indicate a module which functions to transmit call information with authentication information to the server 130 if originating the call. For example, the originating module may be a software type in a general Internet protocol (IP)-phone, may be a hardware type including a dual tone multiple frequency (DTMF) detector therein for applying the PSTN telephone network, and may be an application type in case of a smart phone.

In addition, the callee terminal 120 may indicate a device used by a callee, or another device connected with the device used by the callee. In various embodiments, the callee terminal 120 may indicate a device including a receiving module which is a module on the callee. Herein, the receiving module may indicate a module which functions to, if relieving a call, display whether to authenticate by inquiring about authenticated call information. For example, in case of the smart phone, the receiving module may be an application type.

The server 130 may indicate a device which stores and manages information regarding the caller terminal 110 and the callee terminal 120. In various embodiments, the server 130 may indicate an authentication server which authenticates the caller terminal 110 and the callee terminal 120, and stores and manages information of the authentication terminal in a centralized database (DB).

The caller terminal 110 and the callee terminal 120 may communicate with the server 130 by accessing the network 140 through wireless communication or wired communication. For example, for the communication with the server 130, various communication protocols such as hypertext transfer protocol (HTTP), user datagram protocol (UDP) may be used.

In various embodiments, the caller terminal 110 and the callee terminal 120 each may be a portable electronic device, and may be one of a smart phone, a portable terminal, a mobile phone, a mobile pad, a media player, a tablet computer, a handheld computer, or a personal digital assistant (PDA). In other embodiments, the caller terminal 110 and the callee terminal 120 each may be a stationary device. Also, the caller terminal 110 and the callee terminal 120 each may be a device which combines two or more functions of the above-stated devices.

The server 130 may manage the authentication information of the caller terminal 110 and the callee terminal 120. For example, the server 130 may identify the authentication information of outgoing call information received from the caller terminal 110, and, if receiving a request from the callee terminal 120, transmit the authentication outgoing call information to the callee terminal 120. Herein, the server 130 may transmit the authentication information received from the caller terminal 110 to the callee terminal 120 over the network 140. Herein, the network 140 may be an IP network, an IP-virtual private network (VPN), and so on.

In addition, the caller terminal 110 and the callee terminal 120 may be connected by the voice network 150. Herein, the voice network 150 may be a network (e.g., an access network, an Internet protocol multimedia subsystem (IMS), an integrated services digital network (ISDN)) for implementing the VoIP which is the telephone technology on the Internet or a telephone network (e.g., PSTN) for analog telephone.

In FIG. 1, the network 140 and the voice network 150 are depicted as the two separate networks. However, this is for the sake of explanations, and the network 140 and the voice network 150 may be included in one integrated network.

Figure 2:
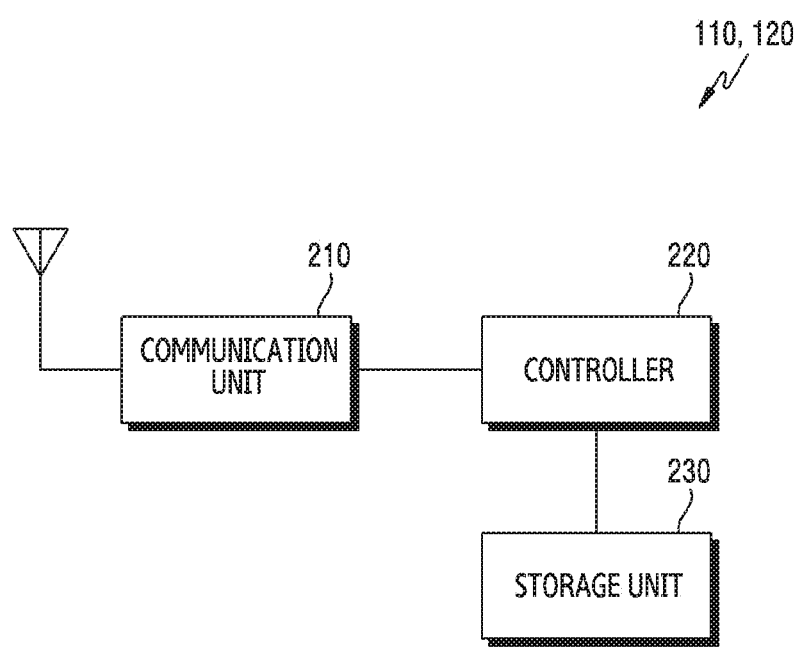
FIG. 2 illustrates an example of a functional configuration of a caller terminal or a callee terminal according to various embodiments of the present disclosure.

FIG. 2 illustrates an example of a functional configuration of a caller terminal 110 or a callee terminal 120 according to various embodiments of the present disclosure. A term such as 'portion' or '~er' indicates a unit for processing at least one function or operation, and may be implemented using hardware, software, or a combination of hardware and software. Referring to FIG. 2, the caller terminal 110 or the callee terminal 120 may include a communication unit 210, a controller 220, and a storage unit 230.

The communication unit 210 may perform functions for transmitting and receiving signals over a wired channel or a wireless channel. For example, the communication unit 210 performs a conversion function between a baseband signal and a bit string according to a physical layer standard of a system. For example, if transmitting data, the communication unit 210 generates complex symbols by encoding and modulating a transmit bit string. Also, if receiving data, the communication unit 210 restores a receive bit string by demodulating and decoding a baseband signal. Also, the communication unit 210 up-converts the baseband signal to a radio frequency (RF) band signal, transmits it via an antenna, and down-converts an RF band signal received via an antenna to a baseband signal. For example, the communication unit 210 may include a transmit filter, a receive filter, an amplifier, a mixer, an oscillator, a digital to analog convertor (DAC), an analog to digital convertor (ADC), and so on.

The communication unit 210 transmits and receives the signals as stated above. Hence, the communication unit 210 may be referred to as a transmitter, a receiver, or a transceiver. Also, in the following, the transmission and the reception over the wireless channel or the cable is used as the meaning which embraces the above-stated processing of the communication unit 210.

The controller 220 controls general operations of the caller terminal 110 or the callee terminal 120. For example, the controller 240 transmits and receives signals through the communication unit 210. Also, the controller 220 records and reads data in and from the storage unit 230. For doing so, the controller 220 may include at least one processor. For example, the controller 220 may include at least one of a communication processor (CP) which performs the control for the communications and an application processor (AP) for controlling an upper layer such as an application program. Further, the controller 220 may be configured to realize procedures and/or methods to be explained in the present disclosure.

The storage unit 230 may store control command code for controlling the caller terminal 110 or the callee terminal 120, control data, or user data. For example, the storage unit 230 may include an application, an operating system (OS), a middleware, and a device driver. Also, the storage unit 230 may include at least one of a volatile memory or a non-volatile memory. The volatile memory may include a dynamic random access memory (DRAM), a static RAM (SRAM), a synchronous DRAM (SDRAM), a phase-change RAM (PRAM), a magnetic RAM (MRAM), a resistive RANI (RRAM), a ferroelectric RAM (FeRAM), and so on. The non-volatile memory may include a read only memory (ROM), a programmable ROM (PROM), an electrically programmable ROM (EPROM), an electrically erasable ROM (EEPROM), a flash memory, and the like. Further, the storage unit 230 may include a non-volatile medium such as a hard disk drive (HDD), a solid state disk (SSD), an embedded multi media card (eMMC), and a universal flash storage (UFS).

In various embodiments, if the apparatus of FIG. 2 is the caller terminal 110, the controller 220 may control to generate and transmit a message for caller authentication. In particular, the controller 220 may control operations of the caller terminal 110 to generate an identifier and information corresponding to the identifier based on an identification number regarding the caller terminal 110 and an identification number regarding the callee terminal 120, to generate a digital signature for information of the caller terminal 110, to encrypt the information, and to transmit a message including the identifier, the digital signature, and the encrypted information to the server 130.

Also, in various embodiments, if the apparatus of FIG. 2 is the callee terminal 120, the controller 220 may receive a message for the caller authentication, and perform the authentication. In specific, the controller 220 may control operations of the callee terminal 120 to generate an identifier based on the identification number regarding the callee terminal 120 and the identification number regarding the caller terminal 110, to transmit a message for requesting information corresponding to the generated identifier, to receive the information from the server 130, and to display the received information.

Figure 3:
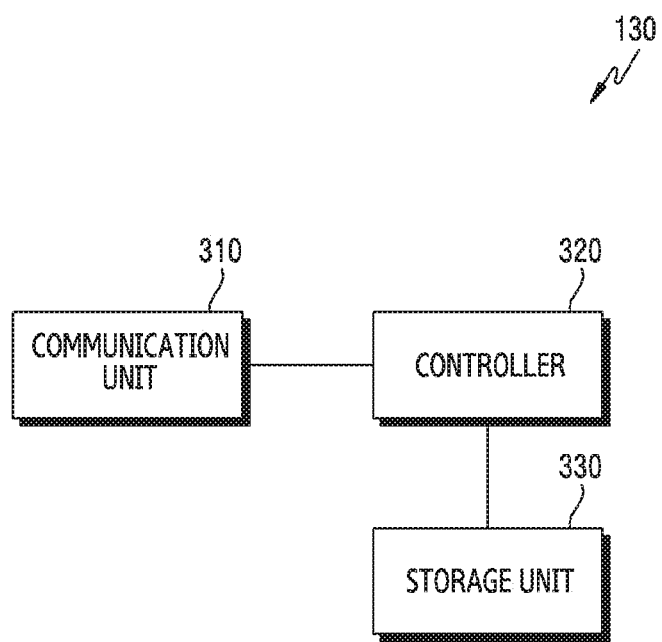
FIG. 3 illustrates an example of a functional configuration of a server according to various embodiments of the present disclosure.

FIG. 3 illustrates an example of a functional configuration of a server 130 according to various embodiments of the present disclosure. Referring to FIG. 3, the server 130 may include a communication unit 310, a controller 320, and a storage unit 330.

The communication unit 310 may perform functions for transmitting and receiving signals. For example, the server 130 may perform operations for transmitting and receiving messages to and from the caller terminal 110 or the callee terminal 120 over the network 140, using the communication unit 310. The communication unit 310 may be referred to as a transmitter, a receiver, or a transceiver. Also, in the following, the transmission and the reception over the wireless channel or the cable is used as the meaning which embraces the above-stated processing of the communication unit 310.

The controller 320 may control general operations of the server 130. For example, the controller 320 transmits and receives signals through the communication unit 310. Also, the controller 320 records and reads data in and from the storage unit 330. For doing so, the controller 320 may include at least one processor. For example, the controller 320 may include at least one of a CP which performs the control for the communications and an AP for controlling an upper layer such as an application program. Further, the controller 320 may be configured to realize procedures and/or methods to be explained in the present disclosure.

The storage unit 330 may store control command code for controlling the server 130, control data, or user data. For example, the storage unit 330 may include an application, an OS, a middleware, and a device driver. Also, the storage unit 330 may include at least one of a volatile memory or a non-volatile memory. The volatile memory may include a DRAM, a SRAM, a SDRAM, a PRAM, a MRAM, a RRAM, a FeRAM, and so on. The non-volatile memory may include a ROM, a PROM, an EPROM, an EEPROM, a flash memory, and the like. Further, the storage unit 330 may include a non-volatile medium such as an HDD, an SSD, an eMMC, and a UFS.

In various embodiments, the controller 320 may receive the message for the authentication from the caller terminal 110, and transmit the message for the authentication to the callee terminal 120. Specifically, the controller 320 may control the operations of the server 130 to receive the message including the encrypted information and the digital signature from the caller terminal 110, to decrypt the received information, to identify the received digital signature, and to transmit a message including the decrypted information and the digital signature to the callee terminal 120.

Figure 4:
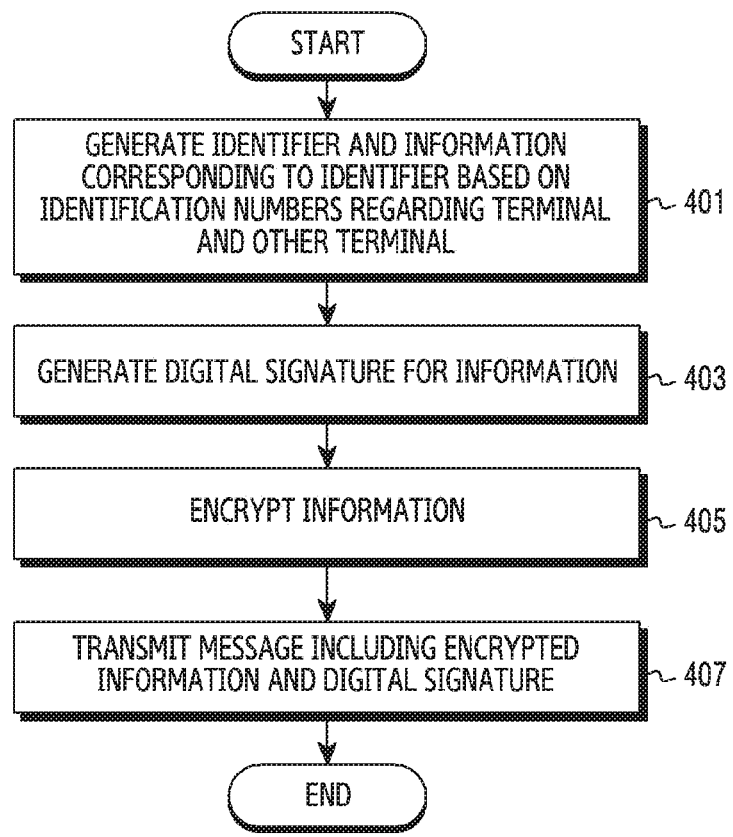
FIG. 4 illustrates an example of an operating method of a caller apparatus according to various embodiments of the present disclosure.

FIG. 4 illustrates an example of an operating method of a caller terminal 110 according to various embodiments of the present disclosure. As shown in FIG. 4, the caller terminal 110 may perform an authentication procedure on outgoing call information.

Referring to FIG. 4, in step 401, the caller terminal 110 generates an identifier based on an identification number regarding the caller terminal 110 and an identification number regarding the callee terminal 120, and generates information corresponding to the generated identifier. Herein, the identification number used to generate the identifier may be information for identifying a user who uses the caller terminal 110 such as a mobile identification number (MIN), a phone number (e.g., a phone number of a general phone, a phone number of an IP-phone, a phone number of an ISDN phone, etc.). For example, the phone number may be information corresponding to the user who uses the corresponding terminal. That is, the phone number may be information for identifying the user of the terminal, regardless of the type of the VoIP protocol or the type of the telephone network (e.g., Internet telephone network, analog telephone network). Accordingly, the identifier generated using the phone number may be used in the procedure for authenticating the caller, even in calls between users of different VoIP protocols or calls between users who use the Internet telephone network and the analog telephone network. In addition, according to another embodiment, the identification number may be a value extracted from the phone number according to a predefined rule, that is, a value processed from the phone number.

In various embodiments, the identifier may indicate an identifier for a combination of the identification number regarding the caller terminal 110 and the identification number regarding the callee terminal 120. Herein, the identifier may be a symbol for identifying a specific combination by comparing with other combinations such as tag, look-up parameter, identifier (ID). For example, the caller terminal 110 may generate a tag for the combination by combining the phone number (the outgoing number) of the caller terminal 110 and the phone number (the incoming number) of the callee terminal 120. More specifically, if the outgoing number is 010-1234-5678 and the incoming number is 010-5678-1234, the tag may be the identifier for identifying {(010-1234-5678)-(010-5678-1234)}. Based on the tag, the combination of the outgoing number and the incoming number may be identified.

In various embodiments, the information corresponding to the identifier may be outgoing call information including the information of the caller. For example, if the caller is a person, the outgoing call information may include information about whether it is an authenticated caller, and information indicating the caller such as a caller's name, a name of an institution of the caller, a caller's position. For example, if the caller is an institution, the outgoing call information may include an institution's name, a category (e.g., public institution, financial institution, etc.) of the institution, and information about whether it is an authentication institution. Further, in various embodiments, the information corresponding to the identifier may be information requiring the authentication of the caller. For example, the caller terminal 110 may generate personal information requiring the caller authentication corresponding to the identifier, or payment information requiring the caller authentication.

After the identifier and the information corresponding to the identifier are generated, in step 403, the caller terminal 110 may generate a digital signature for the information. In various embodiments, the caller terminal 110 may use a private key of the caller terminal 110 to generate the digital signature of the information. Herein, the private key of the caller terminal 110 is a key owned only by the caller, may be referred to as a secret key, and may be used to decrypt (decipher) the encrypted information using a public key corresponding to the private key or to generate the digital signature for the caller. Hence, the digital signature for the information may be may indicate information or data stream for authenticating that the information is generated by the caller terminal 110. In other words, based on the digital signature, it may be authenticated that the information is generated by the authenticated caller. In addition, using the digital signature, the server 130 or the callee terminal 120 may determine whether the information is alteration.

In various embodiments, to generate the digital signature, the caller terminal 110 may digest the information using a cryptographic hash function. For example, next, the caller terminal 110 may encrypt the digested information using the private key of the caller who is the user of the caller terminal 110. Thus, the caller terminal 110 may generate the encrypted digested information corresponding to the digital signature.

After the digital signature is generated, in step 405, the caller terminal 110 encrypts the information. In various embodiments, the caller terminal 110 may use a public key of the server 130 to encrypt the information. Herein, the public key of the server 130 is a key owned by anyone, not just the server 130, and may be used to generate the encrypted information which may be decrypted (deciphered) using a private key of the server 130. Hence, through the encryption using the public key of the server 130, the information may be identified only by the server 130.

In addition, the public key may be obtained from an authentication institution which owns the public key or a target (e.g., the server 130 in case of the public key of the server 130) of the public key.

After the information is encrypted, in step 407, the caller terminal 110 transmits a message including the encrypted information and the digital signature to the server 130. For example, the message may indicate information, a packet, or a data stream including the encrypted information and the digital signature.

Figure 5:
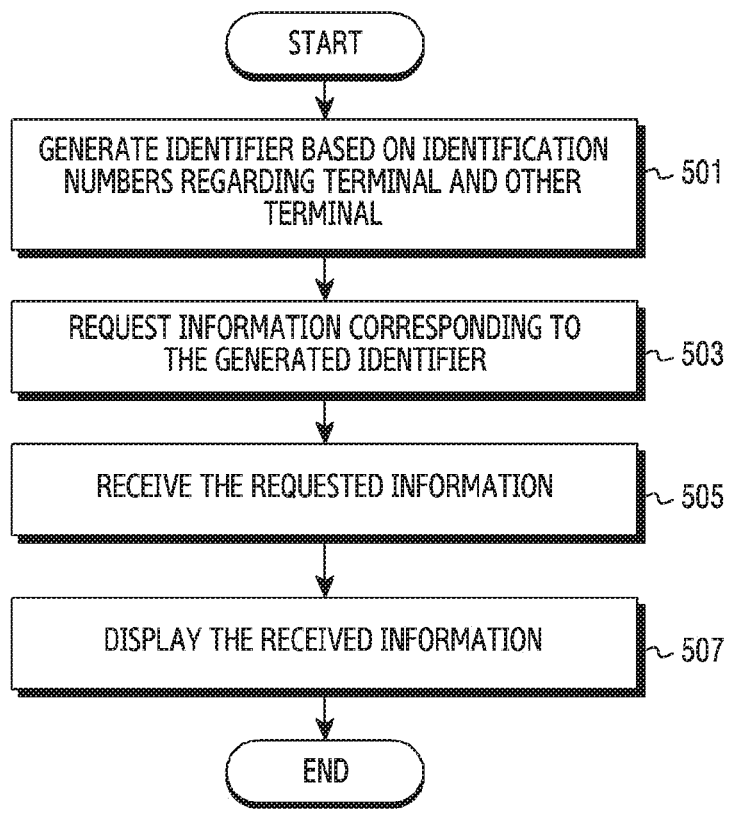
FIG. 5 illustrates an example of an operating method of a callee apparatus according to various embodiments of the present disclosure.

FIG. 5 illustrates an example of an operating method of a callee terminal 120 according to various embodiments of the present disclosure. As shown in FIG. 5, the callee terminal 120 may receive from the server 130 authentication information of outgoing call information transmitted from the caller terminal 110.

Referring to FIG. 5, in step 501, the callee terminal 120 generates an identifier based on an identification number regarding the caller terminal 110 and an identification number regarding the callee terminal 120. Herein, the identification number and the identifier are similar to those described in step 401 of FIG. 4. Accordingly, the identification number used to generate the identifier may be information for identifying the user who uses the apparatus such as mobile identification number, phone number, and the identifier may be a symbol identified by comparing with other combinations such as tag, look-up parameter, ID.

In various embodiments, using an outgoing call received from the caller terminal 110, the callee terminal 120 may detect a phone number (outgoing number) of the caller terminal 110 and a phone number (incoming number) of the callee terminal 120. Hence, the callee terminal 120 may combine the detected outgoing number and incoming number, and thus generate a tag for the combination. For example, if the outgoing number is 010-1234-5678 and the incoming number is 010-5678-1234, the tag may be the identifier for identifying {(010-1234-5678)-(010-5678-1234)}.

After the identifier is generated, in step 503, the callee terminal 120 requests information corresponding to the generated identifier from the server 130. In this case, the callee terminal 120 may transmit a message requesting information corresponding to the generated identifier to the server 130. For example, the operation for requesting the information from the server 130 may be performed if the callee terminal 120 receives a message which notifies presence of authenticated information from the server 130. Alternatively, for example, the operation for requesting the information from the server 130 may be performed repeatedly until the information requested by the callee terminal 120 from the server 130 is received. Specifically, after transmitting the message requesting the information to the server 130, if the callee terminal 120 receives a message indicating no information from the server 130, the callee terminal 120 may transmit a message for re-requesting the information to the server 130.

After requesting the information, in step 505, the callee terminal 120 receives the requested information from the server 130. In this case, the information is information corresponding to the identifier generated in step 501, and includes information of the caller. Also, the information includes the caller information, that is, information of the outgoing call and a digital signature for the caller generated at the caller terminal 110, and may further include a digital signature for the server generated at the server 130.

After receiving the information from the server 130, in step 507, the callee terminal 120 displays the received information. In this case, the callee terminal 120 may use an application or a notification window. Also, the displayed information may include at least one of text, image, and voice. Thus, the callee may identify whether the caller is authenticated or not.

In various embodiments, before displaying the received information, the callee terminal 120 may identify the digital signature generated at the caller terminal 110 using the public key of the caller terminal 110. Thus, the callee terminal 120 may identify that the information is generated by the caller.

Figure 6:
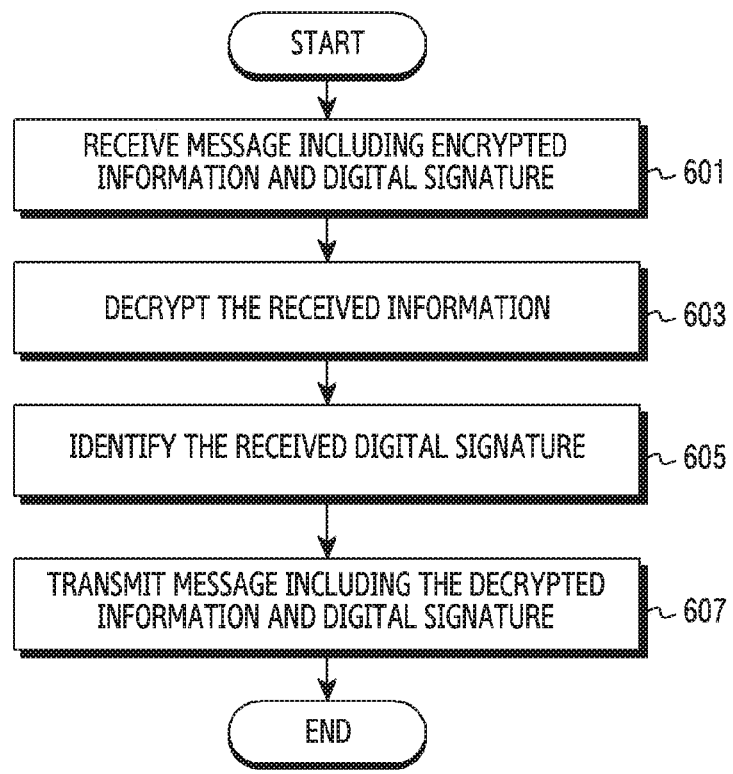
FIG. 6 illustrates an example of an operating method of a server according to various embodiments of the present disclosure.

FIG. 6 illustrates an example of an operating method of a server 130 according to various embodiments of the present disclosure. As shown in FIG. 6, the server 130 may perform communication with the caller terminal 110 and the callee terminal 120.

Referring to FIG. 6, in step 601, the server 130 receives a message including encrypted information and a digital signature from the caller terminal 110. Herein, the encrypted information and the digital signature may be generated at the caller terminal 110. In various embodiments, the encrypted information may indicate the information encrypted in step 405 of FIG. 4, and the digital signature may indicate the digital signature generated in step 403 of FIG. 4.

After receiving the message, in step 603, the server 130 decrypts (deciphers) the encrypted information. In various embodiments, the server 130 may use a private key of the server 130, that is, its private key to decrypt the encrypted information. Herein, the encrypted information indicates the information encrypted using the public key of the server 130. Hence, the encrypted information may be decrypted only by the server 130 which owns the corresponding private key. By decrypting the encrypted information, the server 130 may identify caller information regarding the caller terminal 110.

After decrypting the information, in step 605, the server 130 identifies the digital signature. In various embodiments, the server 130 may use a public key of an apparatus where the digital signature is generated to identify the digital signature. For example, if the server 130 receives the digital signature generated at the caller terminal 110, the server 130 may identify the digital signature using the public key of the caller terminal 110. Hence, the server 130 may identify that the information is received from the caller terminal 110. In addition, the server 130 may identify the digital signature, and then store the decrypted information and the digital signature.

In one embodiment, the server 130 may perform the authentication procedure only on a pre-designated caller. For example, the server 130 may generate or receive and store a list of callers which are targets of an authentication service. In this case, using the list, the server 130 may identify whether the caller identified with the digital signature is included in the list. Thus, the server 130 may provide the authentication service only for the callers of the list. In another embodiment, the server 130 may perform the authentication procedure on a caller which is not pre-designated.

After identifying the digital signature, in step 607, the server 130 transmits a message including the decrypted information and the digital signature to the callee terminal 120. In so doing, after encrypting the message, the server 130 may transmit the encrypted message. Herein, the operation of transmitting the message may be conducted only if the callee terminal 120 requests the decrypted information from the server 130. For example, in response to the request of the callee terminal 120, the server 130 may transmit caller information generated at the caller terminal 110 and the digital signature to the callee terminal 120.

In various embodiments, if transmitting the message, the server 130 may further add the digital signature of the server 130, besides the digital signature for the caller terminal 110. In this case, the callee terminal 120 may additionally identify that the information is transmitted from the server 130.

Figure 7:
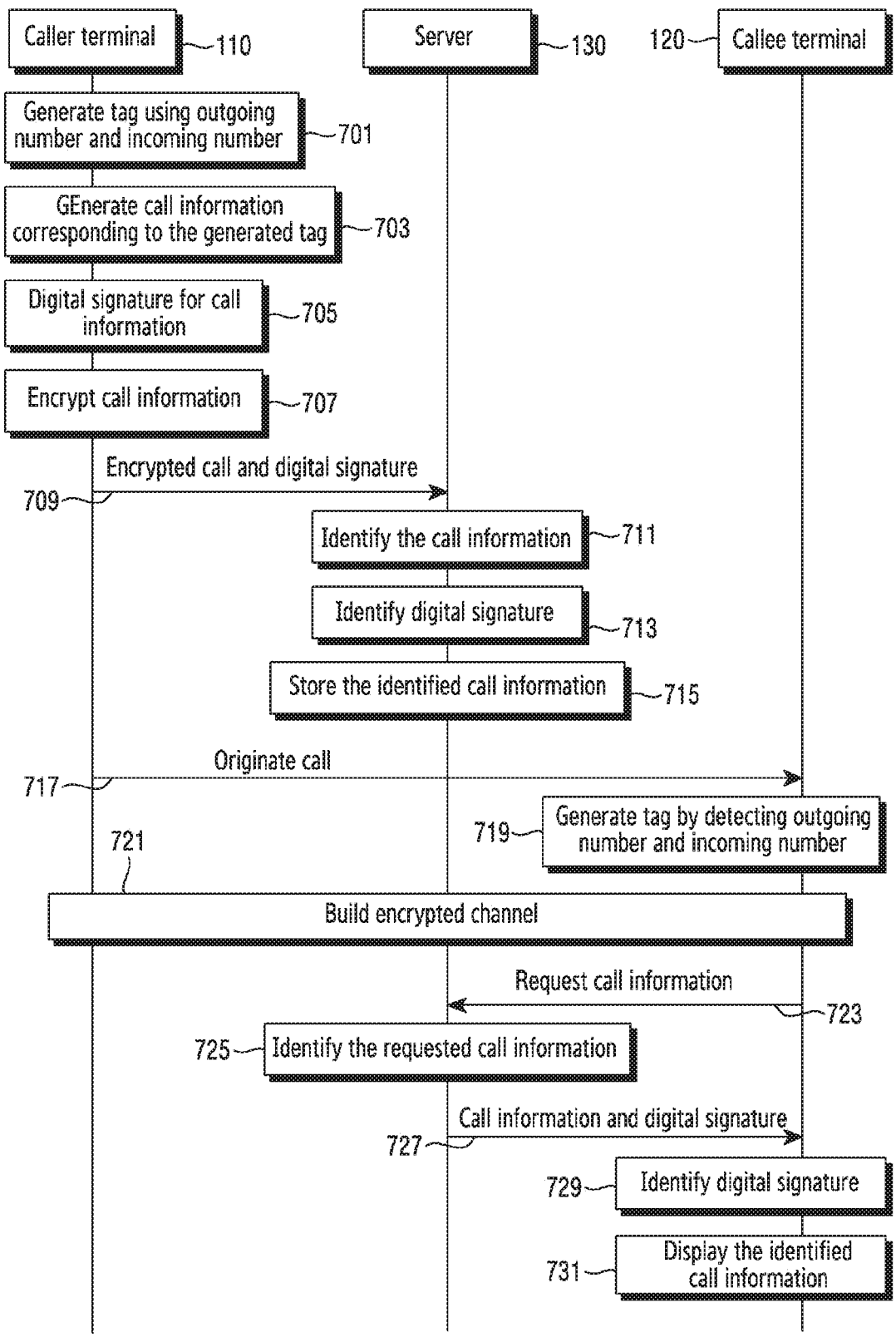
FIG. 7 illustrates an example of signal flows for caller authentication according to various embodiments of the present disclosure.
Figure 8:
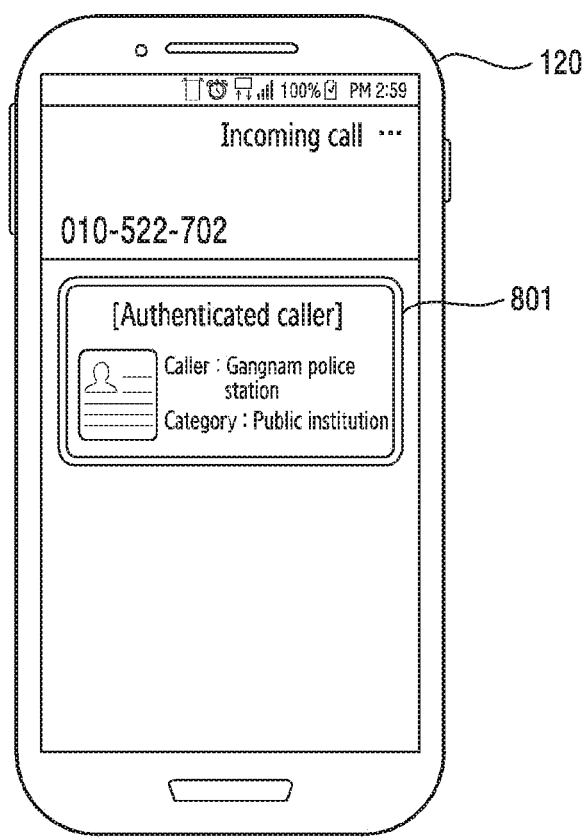
FIG. 8 illustrates an example of a screen displayed in a callee terminal according to various embodiments of the present disclosure.

FIG. 7 illustrates an example of signal flows for caller authentication according to various embodiments of the present disclosure. Also, FIG. 8 illustrates an example of a screen displayed at a callee terminal according to various embodiments of the present disclosure. In FIG. 7, it is assumed that authentication information of the caller terminal 110 is identified by the server 130 and then the caller terminal 110 transmits an outgoing call to the callee terminal 120, that is, call information of the caller terminal 110 is registered at the server 130 in advance. In addition, it is assumed that the server 130 does not additionally generate the digital signature of the server 130 with respect to the identified information.

Referring to FIG. 7, in step 701, the caller terminal 110 generates a tag using an outgoing number and an incoming number. Herein, the tag may indicate an identifier for a combination of the outgoing number and the incoming number. For example, if the outgoing number is 010-1234-5678 and the incoming number is 010-5678-1234, the tag may be the identifier for identifying {(010-1234-5678)-(010-5678-1234)}. Hence, using the tag, a specific combination may be identified among a plurality of outgoing number-incoming number combinations.

After generating the tag, in step 703, the caller terminal 110 generates call information corresponding to the generated tag. Herein, the call information may indicate information regarding the outgoing call generated at the caller terminal 110. For example, the call information may include information indicative of the caller such as caller's name, title, category information. Since there is one tag corresponding to the call information, the call information may identified by the tag. In other words, the tag and the call information may have a one-to-one relationship.

After generating the call information, in step 705, the caller terminal 110 generates a digital signature for the call information using a private key of the caller terminal 110. In various embodiments, the caller terminal 110 may generate information for authenticating that the call information is generated by the caller. In this case, the caller terminal 110 may generate the digital signature using the cryptographic hash function. The operation of generating the digital signature using the cryptographic hash function is similar to the operation described in step 403 of FIG. 4, and thus its specific explanations are omitted.

After generating the digital signature, in step 707, the caller terminal 110 encrypts the call information using a public key of the server 130. The caller terminal 110 may acquire the public key of the server 130 by requesting it from the server 130 or an authentication institution which manages the public key. By encrypting using the public key of the server 130, the call information may be identified only by the server 130 which owns a private key corresponding to the public key.

After encrypting the call information, in step 709, the caller terminal 110 may transmit a message including the encrypted call information and the digital signature to the server 130. Also, in various embodiments, the message may further include security data required to authenticate the caller. In addition, the caller terminal 110 may transmit the encrypted call information and the digital signature to the server 130 using separate messages respectively.

As transmitting the message including the encrypted call information and the digital signature to the server 130, the operation of the caller terminal 110 for registering the call information of the caller terminal 110 at the server 130 in advance may be finished.

In step 709, the server 130 may receive the message including the encrypted call information and the digital signature from the caller terminal 110. In this case, the server 130 may receive separate messages of the information such as a message for the encrypted call information and a message for the digital signature.

After receiving the message, in step 711, the server 130 identifies the call information by decrypting the encrypted call information using the private key of the server 130, that is, its private key. For example, the server 130 may reconvert the encrypted call information to the original call information using a decryption algorithm which uses the private key of the server 130.

After identifying the call information, in step 713, the server 130 identifies the received digital signature using the public key of the caller terminal 110. Hence, the server 130 may identify that the call information is generated by the user of the caller terminal 110.

After identifying the digital signature, the in step 715, the server 130 stores the identified call information and digital signature. Herein, the server 130 may store the call information and the digital signature using the tag (the tag generated in step 701) generated using the outgoing number and the incoming number. In other words, call information and digital signatures stored in the server 130 may be stored to be identified by the tag. In addition, the stored call information and digital signature may be deleted at specific intervals, and the stored call information and digital signature may be updated if new call information and digital signature are identified.

Thus, the operation for registering the call information of the caller terminal 110 at the server 130 in advance may be finished.

After registering the call information of the caller terminal 110 at the server 130, in step 717, the caller terminal 110 originates a call to the callee terminal 120. That is, the caller terminal 110 transmits the outgoing call to the callee terminal 120.

More specifically, the caller terminal 110 may transmit a call setup message to the caller terminal 110 or a gateway which manages the voice network 150. Herein, the gateway may be voice gateway which manages the call transmission and reception. If the call setup message is transmitted to the gateway, the gateway forwards the received call setup message to the callee terminal 120.

Hence, the callee terminal 120 may transmit a ringback message to the caller terminal 110 or the gateway in response to the received call setup message. If the ringback message is transmitted to the gateway, the gateway may forward the received ringback message to the caller terminal 110. As the caller terminal 110 receives the ringback message, the caller terminal 110 may identify that the outgoing call to the callee terminal 120 is normally performed. Through the above-stated process, the call originating operation of the caller terminal 110 may be carried out.

After the call originating operation, in step 719, the callee terminal 120 generates a tag by detecting the outgoing number and the incoming number. Herein, the tag may indicate an identifier for a combination of the outgoing number and the incoming number. For example, if the outgoing number is 010-1234-5678 and the incoming number is 010-5678-1234, the tag may be the identifier for identifying {(010-1234-5678)-(010-5678-1234)}. Alternatively, the callee terminal 120 may detect only the outgoing number and then generate a combination using a pre-stored incoming number.

After the callee terminal 120 generates the tag, in step 721, the caller terminal 110, the callee terminal 120, and the server build an encrypted channel. Herein, the encrypted channel may indicate a channel for encrypting using the public key of the server 130 and decrypting using the private key of the server 130. Also, the encrypted channel may indicate a network encrypted among the caller terminal 110, the callee terminal 120, and the server 130.

To build the encrypted channel, the server 130 may receive the tag for the combination of the outgoing number and the incoming number from the caller terminal 110 and the callee terminal 120 respectively. For example, if receiving the ringback message from the callee terminal 120 or the gateway, the caller terminal 110 may include the tag in a message which requests to build the encrypted channel and transmit it to the server 130. In addition, if transmitting the ringback message to the caller terminal 110 or the gateway, the callee terminal 120 may include the tag in a message which requests to build the encrypted channel and transmit it to the server 130.

Hence, if determining that the tags received at the server 130 are identical, the server 130 builds the encrypted channel among the caller terminal 110, the callee terminal 120, and the server 130.

In various embodiments, if the encrypted channel is established, the server 130 may transmit a message notifying that the authenticated call information is stored in the server 130 to the caller terminal 110 and/or the callee terminal 120.

After the encrypted channel is established, in step 723, the callee terminal 120 requests call information corresponding to the tag generated in step 719 from the server 130. Herein, the call information corresponding to the generated tag is information regarding the combination of the outgoing number and the incoming number detected in step 719, and may indicate information of the caller of the originated call in step 717.

In some embodiments, as receiving the message notifying that the authenticated call information is stored from the server 130, the callee terminal 120 may perform the request. Alternatively, in other embodiment, as the encrypted channel is established, the callee terminal 120 may perform the request.

If the call information is requested by the callee terminal 120, in step 725, the server 130 identifies whether the requested call information is stored in the server 130. In this case, using the tag received from the callee terminal 120, the server 130 may identify the requested call information among one or more call information stored in the server 130.

If identifying the call information requested from the callee terminal 120, in step 727, the server 130 transmits a message including the identified call information and the digital signature for the caller to the callee terminal 120. By contrast, if not identifying the requested call information, the server 130 transmits a message notifying that the requested call information is not authenticated to the callee terminal 120.

If the message including the call information and the digital signature is transmitted to the callee terminal 120, in step 729, the callee terminal 120 identifies the digital signature using the public key of the caller terminal 110. Herein, the callee terminal 120 may acquire the public key of the caller terminal 110 by requesting from the caller terminal 110 or an authentication institution which manages the public key. Also, the identified call information may include information of the public key of the caller terminal 110. By identifying the received digital signature, the callee terminal 120 may identify that the received call information is generated by the caller terminal 110.

After identifying the digital signature received at the callee terminal 120, in step 731, the callee terminal 120 displays the received call information. For example, the callee terminal 120 may display authentication information 801 on a incoming call screen displayed at the callee terminal 120, as shown in FIG. 8. Herein, the authentication information 801 may include information regarding whether the caller is authenticated or not, and information of the caller (e.g., caller's name (Gangnam police station), category (public institution), etc.). Based on the displayed authentication information 801, the callee who is the user of the callee terminal 120 may determine whether the caller is authenticated, and thus determine whether to connect the incoming call.

Hence, the operation of the callee terminal 120 for authenticating the caller for the originated call may be finished.

Figure 9:
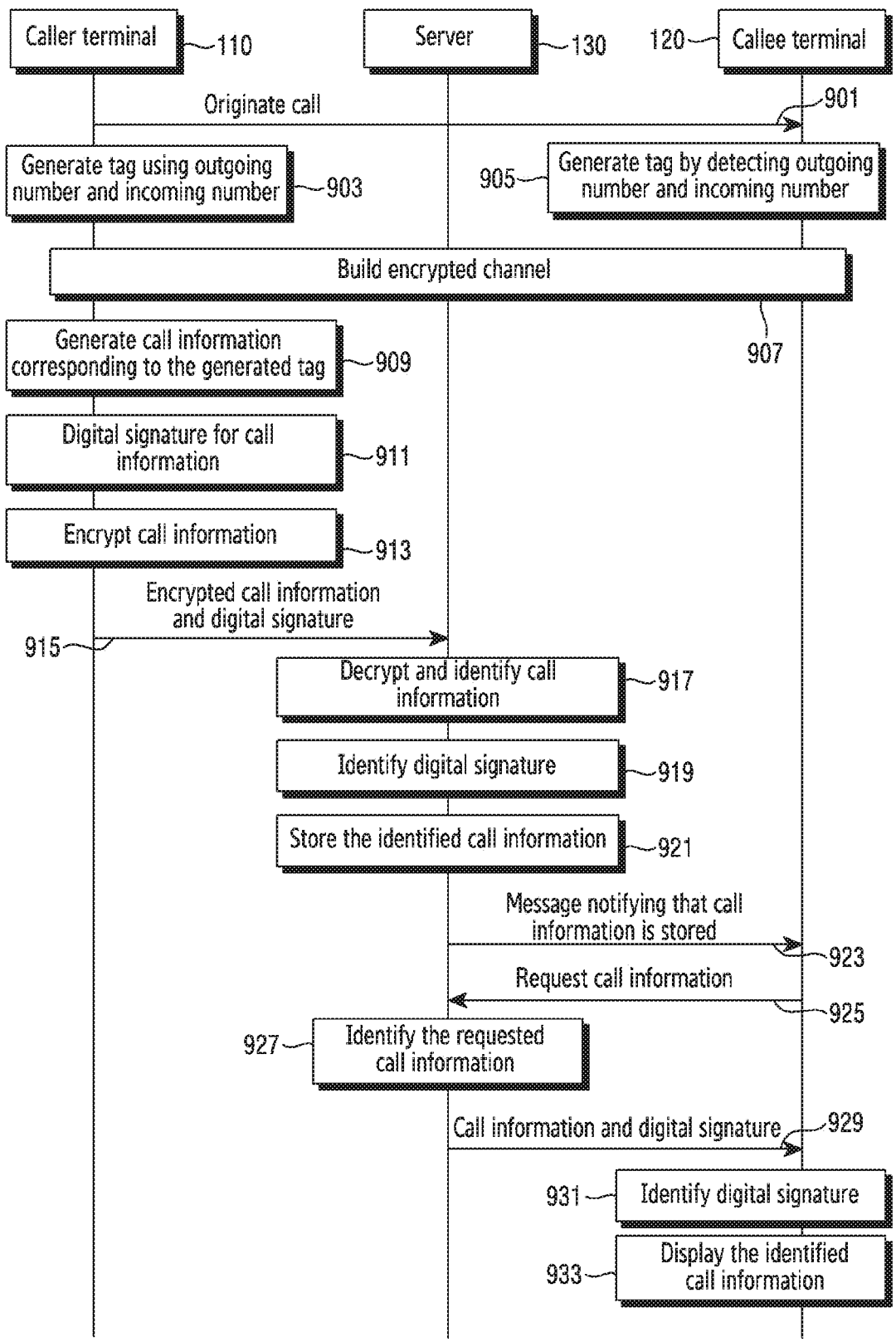
FIG. 9 illustrates another example of signal flows for caller authentication according to various embodiments of the present disclosure.

FIG. 9 illustrates another example of signal flows for caller authentication according to various embodiments of the present disclosure. In FIG. 9, it is assumed that, after the caller terminal 110 transmits an outgoing call to the callee terminal 120, call information of the caller terminal 110 is registered at the server 130. In addition, it is assumed that the server 130 does not additionally generate a digital signature of the server 130 with respect to the identified information.

Referring to FIG. 9, in step 901, the caller terminal 110 originates a call to the callee terminal 120. That is, the caller terminal 110 transmits the outgoing call to the callee terminal 120. The signaling procedure for the call setup message and the ringback message regarding the call origination is similar to the descriptions in step 717 of FIG. 7, and accordingly its detailed explanations are omitted.

If the call is originated, in step 903, the caller terminal 110 generates a tag using an outgoing number and an incoming number. The generated tag may be used to identify a specific combination among one or more outgoing number-incoming number combinations.

Also, if the call is originated, in step 905, the callee terminal 120 generates a tag by detecting the outgoing number and the incoming number. Herein, the tag may indicate an identifier for identifying the combination of the outgoing number and the incoming number. The tag generated in step 905 and the tag generated in step 903 are identical, and are used to identify the same combination of the outgoing number and the incoming number.

After the tags are generated at the caller terminal 110 and the callee terminal 120 respectively, in step 907, the caller terminal 110, the callee terminal 120, and the server 130 build an encrypted channel. Herein, the encrypted channel may be established based on the tag generated in step 903 and the tag generated in step 905. In addition, the encrypted channel may indicate a network encrypted among the caller terminal 110, the callee terminal 120, and the server 130. Details regarding the encrypted channel establishment are similar to the descriptions in step 721 of FIG. 7, and accordingly detailed explanations are omitted.

Operations of step 909 through step 921 corresponding to the steps after the encrypted channel is established are similar to the operations of step 703 through step 715 described in FIG. 7, and accordingly detailed explanations are omitted.

After storing call information of the caller terminal 110 in the server 130 in step 921, in step 923, the server 130 transmits a message notifying that the authenticated call information is stored to the callee terminal 120. Herein, the authenticated call information may include the call information of the caller terminal 110 or call information of unspecified devices. In some embodiments, the server 130 may transmit the message using the communication protocol such as HTTP, UDP. In other embodiments, the operation of transmitting the message of step 923 may be omitted.

Operations of step 925 through step 933 corresponding to the steps after the message notifying that the authenticated call information is stored is transmitted are similar to the operations of step 723 through step 731 described in FIG. 7, and accordingly detailed explanations are omitted.

Figure 10:
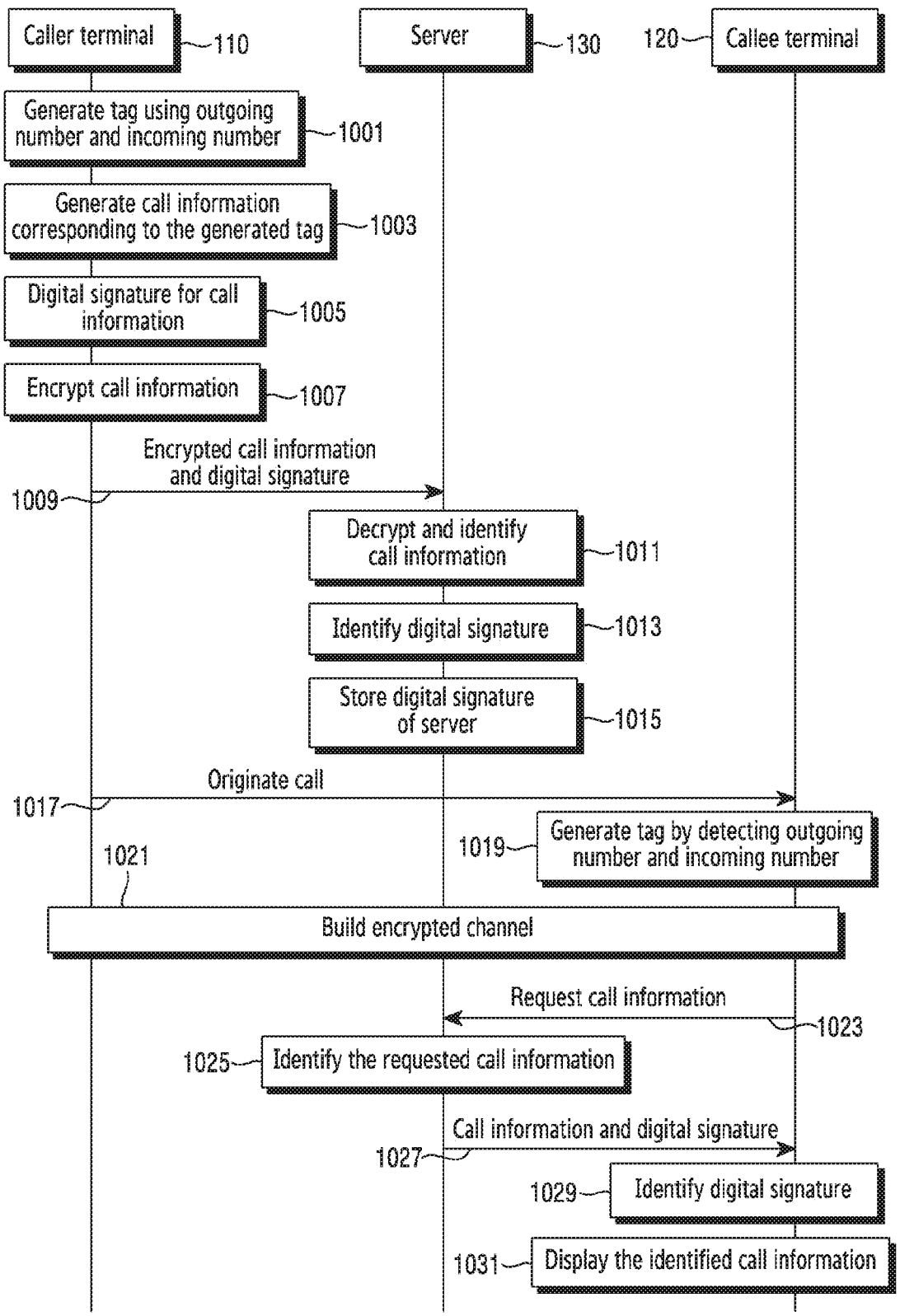
FIG. 10 illustrates yet another example of signal flows for caller authentication according to various embodiments of the present disclosure.

FIG. 10 illustrates yet another example of signal flows for caller authentication according to various embodiments of the present disclosure. In FIG. 10, it is assumed that, after authentication information of the caller terminal 110 is identified by the server 130, the caller terminal 110 transmits an outgoing call to the callee terminal 120, that is, call information of the caller terminal 110 is registered in advance at the server 130. In addition, it is assumed that the server 130 additionally generates a digital signature of the server 130 with respect to the identified call information.

Referring to FIG. 10, operations of step 1001 through step 1013 are similar to the operations of step 703 through step 713 described in FIG. 7, and accordingly detailed explanations are omitted.

After identifying the digital signature generated at the caller terminal 110 in step 1013, in step 1015, the server 130 generates a digital signature using a private key of the server 130, that is, using its private key, and stores call information and digital signatures. Herein, the digital signatures may include the digital signature (step 1005) generated at the caller terminal 110 and the digital signature generated at the server 130. In various embodiments, the server 130 may generate the digital signature using the cryptographic hash function. The specific operation of generating the digital signature using the cryptographic hash function is similar to the operation described in step 403 of FIG. 4, and accordingly its detailed explanations are omitted.

Also, in various embodiments, the server 130 may store the call information and the digital signatures using the tag (the tag generated in step 1001) generated using the outgoing number and the incoming number. In other words, the call information and the digital signatures stored in the server 130 may be stored to be identified by the tag. In addition, the stored call information and digital signatures may be detected at specific intervals, and new call information and a new digital signature may be updated if the new call information and the new digital signature are identified.

Operations of step 1017 through step 1027 are similar to the operations of step 717 through step 727 described in FIG. 7, and accordingly detailed explanations are omitted.

If the message including the call information and the digital signatures is transmitted to the callee terminal 120, in step 1029, the callee terminal 120 identifies the received digital signatures. In various embodiments, the callee terminal 120 may identify the digital signature (the digital signature generated in step 1005) generated at the caller terminal 110 using the public key of the caller terminal 110, or identify the digital signature (the digital signature generated in step 1015) generated at the server 130 using the public key of the server 130. Alternatively, the caller terminal 110 may identify all the digital signatures received. Herein, the public key used to identify the digital signatures may be obtained by requesting from corresponding devices or the authentication institution which manages the public key. The callee terminal 120, by identifying the received digital signatures, may determine that the received call information is the authentication information.

After identifying the received digital signatures, in step 1031, the callee terminal 120 displays the received call information. Herein, the call information may be displayed like the authentication information 801 of FIG. 8. Content regarding the operation of displaying the call information is similar to the descriptions in step 731 of FIG. 7, and accordingly detailed explanations are omitted.

Figure 11:
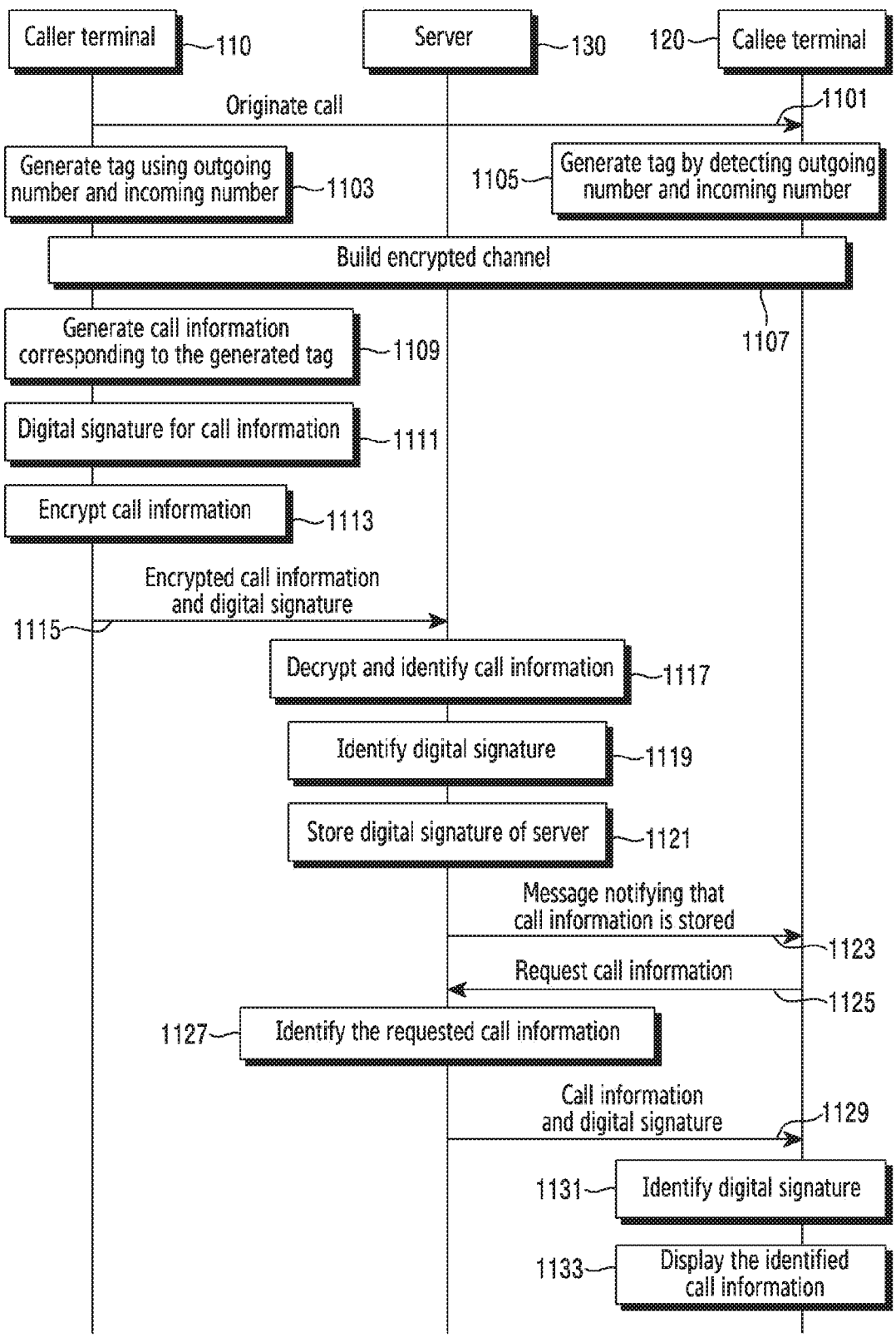
FIG. 11 illustrates still another example of signal flows for caller authentication according to various embodiments of the present disclosure.

FIG. 11 illustrates still another example of signal flows for caller authentication according to various embodiments of the present disclosure. In FIG. 11, it is assumed that, after the caller terminal 110 transmits an outgoing call to the callee terminal 120, call information of the caller terminal 110 is registered at the server 130. In addition, it is assumed that the server 130 additionally generates a digital signature of the server 130 with respect to the identified information.

Referring to FIG. 11, operations of step 1101 through step 1119 are similar to the operations of step 901 through step 919 described in FIG. 9, and accordingly detailed explanations are omitted.

After identifying the digital signature generated at the caller terminal 110, in step 1119, in step 1121, the server 130 generates a digital signature using a private key of the server 130, and stores call information and digital signatures. Herein, the digital signatures may include the digital signature (step 1111) generated at the caller terminal 110 and the digital signature generated at the server 130. In various embodiments, the server 130 may generate the digital signature using the cryptographic hash function. The specific operation of generating the digital signature using the cryptographic hash function is similar to the operation described in step 403 of FIG. 4, and accordingly its detailed explanations are omitted.

Also, in various embodiments, the server 130 may store the call information and the digital signatures using a tag (the tag generated in step 1103) generated using the outgoing number and the incoming number. In other words, the call information and the digital signatures stored in the server 130 may be stored to be identified by the tag. In addition, the stored call information and digital signatures may be detected at specific intervals, and if new call information and digital signature are identified, the new call information and the new digital signature may be updated.

Operations of step 1123 through step 1129 are similar to the operations of step 923 through step 929 described in FIG. 9, and accordingly detailed explanations are omitted.

If the message including the call information and the digital signatures is transmitted to the callee terminal 120 in step 1129, in step 1131, the callee terminal 120 identifies the received digital signatures. In various embodiments, the callee terminal 120 may identify the digital signature (the digital signature generated in step 1111) generated at the caller terminal 110 using the public key of the caller terminal 110, or identify the digital signature (the digital signature generated in step 1121) generated at the server 130 using the public key of the server 130. Alternatively, the caller terminal 110 may identify all the digital signatures received. Herein, the public key used to identify the digital signatures may be obtained by requesting from corresponding devices or the authentication institution which manages the public key. The callee terminal 120, by identifying the received digital signatures, may determine that the received call information is the authenticated information.

After identifying the received digital signatures, in step 1133, the callee terminal 120 displays the received call information. Herein, the call information may be displayed like the authentication information 801 of FIG. 8. Content regarding the operation of displaying the call information is similar to the descriptions in step 731 of FIG. 7, and accordingly detailed explanations are omitted.

Figure 12:
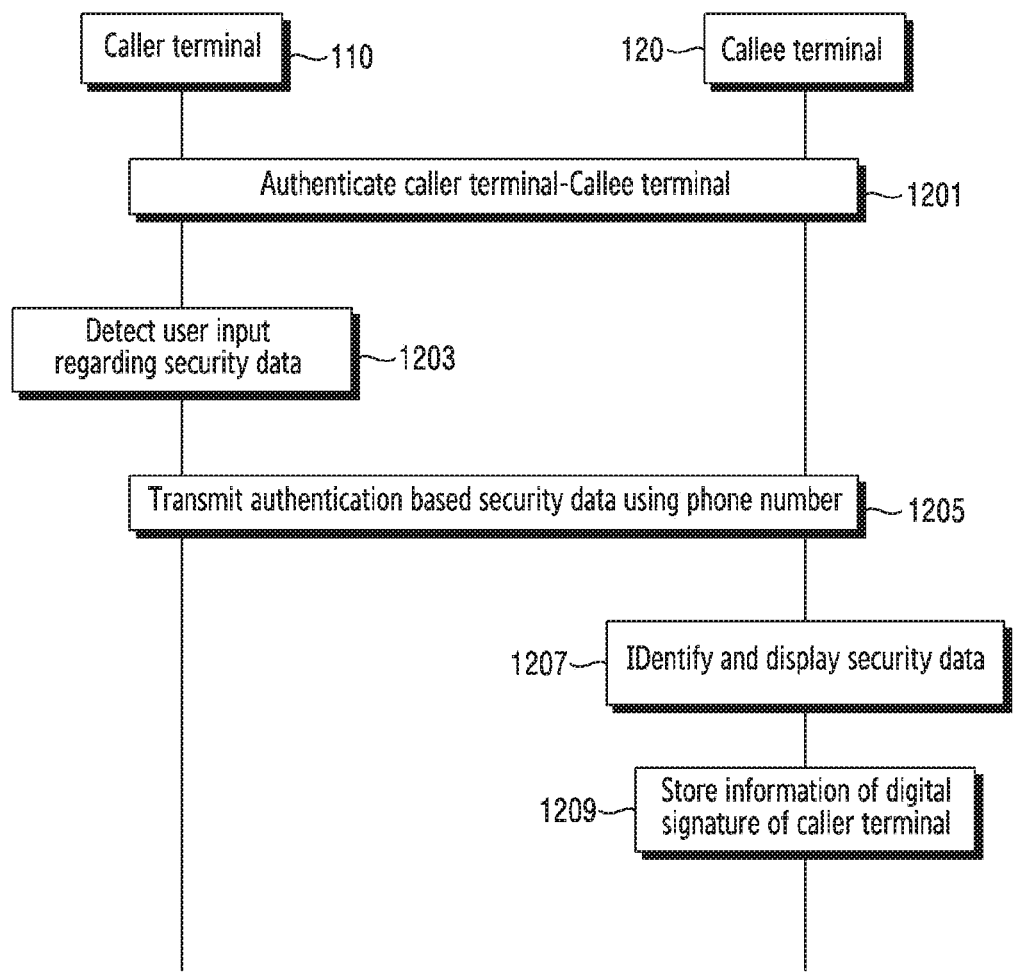
FIG. 12 illustrates an example of signal flows for transmitting security data using caller authentication according to various embodiments of the present disclosure.

FIG. 12 illustrates an example of signal flows for transmitting security data using caller authentication according to various embodiments of the present disclosure. Referring to FIG. 12, it is assumed that transmission and reception of the security data is performed if the authentication for the caller terminal 110 and the callee terminal 120 corresponding to step 1201 is finished. Namely, the transmission and reception of the security data is performed if the authentication procedure as mentioned in FIG. 7 through FIG. 11 is finished.

In step 1203, the caller terminal 110 detects a user input regarding the security data. In various embodiments, the security data may indicate information requiring the authentication on the caller. For example, the security data may indicate information for the caller to request a payment from the callee. Content regarding payment information shall be elucidated in FIG. 13. For example, the security data may indicate information about a certificate transmitted from the authentication institution to the callee. In this case, the certificate is effective if the authentication institution is authorized, and the authentication on the caller is necessary.

Herein, the user input regarding the security data may indicate a user's input for generating a message for transmitting the security data stored in the caller terminal 110. Also, it may indicate a user's input which moves security data stored in other device to the caller terminal 110. For example, the caller terminal 110 may detect a user's input which moves a certificate stored in a computer to the caller terminal 110.

After detecting the user input, in step 1205, the caller terminal 110 may transmit the security data to the callee terminal 120 using the authentication procedure described in FIG. 7 through FIG. 11. That is, through the tag for the combination of the outgoing number and the incoming number and the authentication procedure based on the server 130, the security data may be transmitted to the callee terminal 120. For example, the call information described in FIG. 7 may be changed to the security data and the PKI based authentication procedure using the public key and the private key may be performed. That is, the caller terminal 110 may perform the operation for encrypting the security data and generating the digital signature, and the security data may be transmitted to the callee terminal 120 via the server 130 which functions as the authentication server.

If the security data is transmitted from the caller terminal 110, in step 1207, the callee terminal 120 may identify the received security data and displays the identified security data. In some embodiments, to identify the received security data, the callee terminal 120 may use the public key of the caller terminal 110. For example, the callee terminal 120 may identify the digital signature generated at the caller terminal 110 included in the received security data using the stored public key of the caller terminal 110. Hence, the callee terminal 120 may identify that the security data is received from the authenticated caller.

In other embodiment, the callee terminal 120 may use the public key of the server 130 to identify the received security data. In this case, it is assumed that the digital signature generated at the server 130 is included in the received security data. For example, assuming that the server 130 is a reliable authentication server, the callee terminal 120 may identify that the security data is the authenticated information according to identifying the digital signature using the public key of the server 130.

In addition, if identifying the received security data, the callee terminal 120 displays the received security data. Herein, if the received security data is identified as the authenticated information as stated above, its information may be also displayed. For example, the callee terminal 120 may display content of the received security data, and also display a phrase "authenticated caller". Hence, the callee which is the user of the callee terminal 120 may identify that the security data is received from the authenticated caller.

After identifying and displaying the received security data, in step 1209, the callee terminal 120 may store information of the digital signature of the caller terminal 110. In some embodiments, the callee terminal 120 may designate a separate storage space for storing the digital signature regarding the transmission and reception of the security data. For example, the callee terminal 120 may classify the storage space according to a type of the security data. For example, the callee terminal 120 may classify the storage space according to the caller who transmits the security data.

In other embodiment, the callee terminal 120 may store the digital signature regarding the transmission and reception of the security data in an external device. For example, if the callee terminal 120 receives the security data from the caller terminal 110, the callee terminal 120 may request the server 130 to separately classify and store the digital signature for the callee terminal 120. For example, the callee terminal 120 may request a separate server for storing the digital signature regarding the transmission and reception of the security data to store the digital signature.

Through the operations as stated above, the callee terminal 120 may rely on the security data requiring the authentication on the caller transmitted from the caller terminal 110, and perform an additional operation using the received security data.

In FIG. 12, it has been described that the caller terminal 110 transmits the security data to the callee terminal 120. However, according to various embodiments, the callee terminal 120 may transmit the security data to the caller terminal 110. For example, by inversely using the procedure described in FIG. 12, the callee terminal 120 may provide the security data requiring the authentication on the callee of the call to the caller terminal 110.

Figure 13:
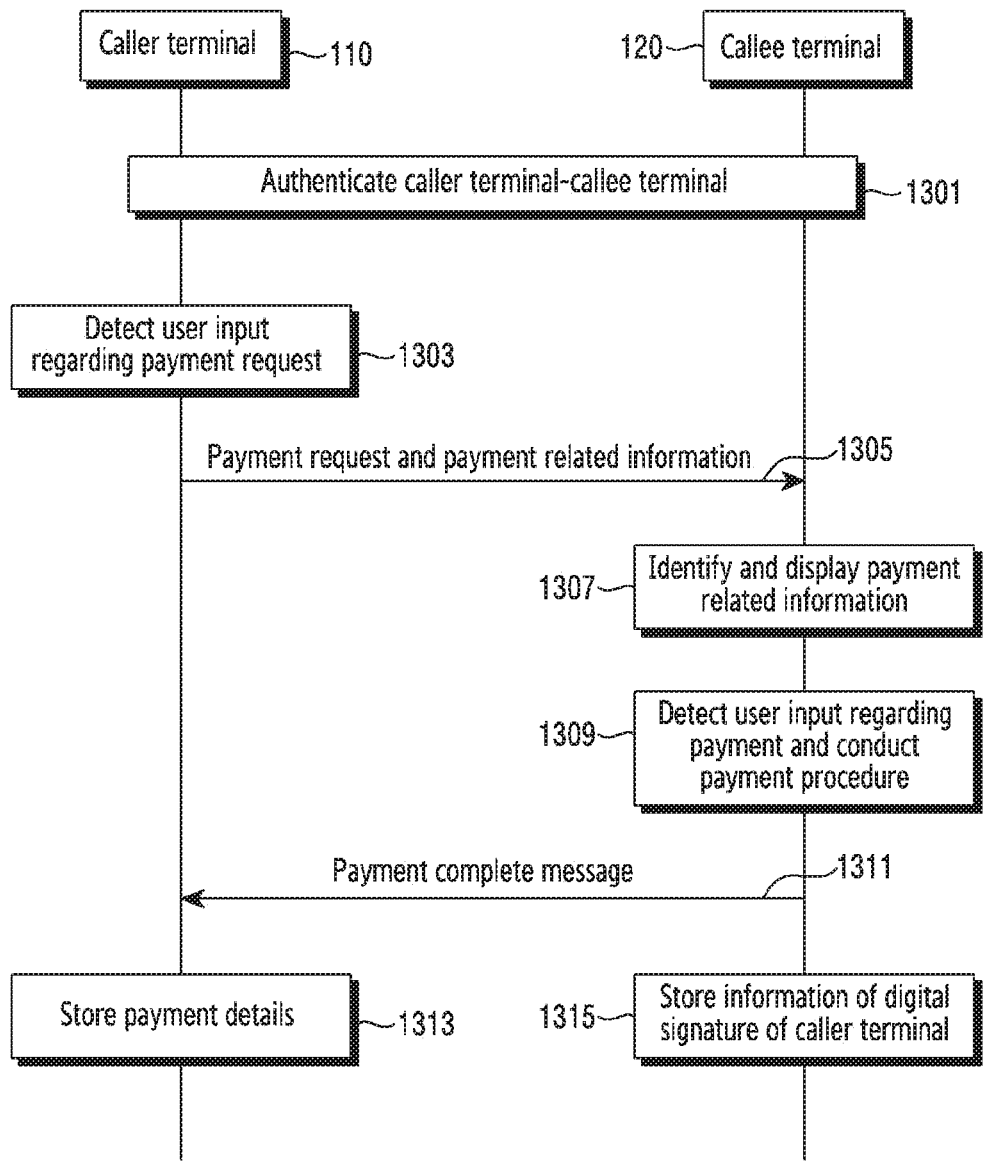
FIG. 13 illustrates an example of signal flows for performing a payment using caller authentication according to various embodiments of the present disclosure.

FIG. 13 illustrates an example of signal flows for performing a payment using caller authentication according to various embodiments of the present disclosure. Referring to FIG. 13, the operation for conducting the payment assumes that the authentication on the caller terminal 110 and the callee terminal 120 corresponding to step 1301 is finished. That is, the operation for conducting the payment is performed after the authentication procedure mentioned in FIG. 7 through FIG. 11 is finished.

In step 1303, the caller terminal 110 detects a user input regarding a payment request. In some embodiments, the user input may be an input for generating information regarding the payment to be requested from the callee terminal 120. For example, the caller may generate payment related information to transmit to the callee terminal 120 using a payment application installed on the caller terminal 110.

In another embodiment, the caller terminal 110 may detect a user input for inputting information about an account to be used for the payment and the caller. For example, for the payment to request from the callee terminal 120, the caller may input the account number to be used for the payment or additionally the caller's name. For example, the caller may input product information, price information, and so on.

In yet another embodiment, the caller terminal 110 may detect an input for identifying the caller for pre-generated payment information. For example, if the payment information and an OK tap are displayed on a touch screen, the caller terminal 110 may detect a user's touch input for the OK tap.

If detecting the user input regarding the payment request, in step 1305, the caller terminal 110 transmits the payment request and the payment related information to the callee terminal 120. Herein, the payment related information may include the information generated based on the user input detected in step 1303. For example, the payment related information such as caller's name or title, caller's account number, payment amount, payment service institution may be transmitted to the callee terminal 120.

In some embodiments, to transmit the payment request and the payment related information, the caller terminal 110 may use the authentication procedure described in FIG. 7 through FIG. 11. For example, through the authentication procedure based on the tag for the combination of the outgoing number and the incoming number and the server 130 which operates as the authentication server, the payment related information may be transmitted to the callee terminal 120. In this case, the caller terminal 110 may perform the operations for encrypting the information and generating the digital signature, and the encrypted information and the digital signature may be transmitted through the authentication server 130.

In other embodiment, the caller terminal 110 may generate a message by including the digital signature generated at the caller terminal 110 in the payment request and the payment related information, and then transmit the generated message using a general communication path. For example, the caller terminal 110 may transmit the message using cellular communication which uses at least one of long term evolution (LTE), LTE Advance (LTE-A), code division multiple access (CDMA), wideband CDMA (WCDMA), universal mobile telecommunications system (UMTS), wireless broadband (WiBro), or global system for mobile communications (GSM). Alternatively, the caller terminal 110 may transmit the message over Ethernet using wireless fidelity (WiFi).

After transmitting the message, in step 1307, the callee terminal 120 identifies the received payment related information, and displays the identified information. In various embodiments, to identify the received payment related information, the callee terminal 120 may use the public key of the caller terminal 110. For example, the callee terminal 120 may identify the digital signature generated at the caller terminal 110 included in the received payment information using the stored public key of the caller terminal 110. Hence, the callee terminal 120 may identify that the received payment information is received from the authenticated caller, and that the information is not alteration.

After identifying the payment related information, the callee terminal 120 displays the identified payment related information. Herein, if the received payment information is identified as the authenticated information as stated above, its information may be also displayed. For example, the callee terminal 120 may display a phrase "authenticated payment information" with the payment related information. Thus, the callee who is the user of the callee terminal 120 may identify that the payment related information is received from the authenticated caller.

In various embodiments, the callee terminal 120 may display the received payment information using a payment application. For example, the callee terminal 120 may execute the payment application while displaying the payment related information such as account number, caller's name, payment amount. Hence, the callee may proceed with the payment procedure, without separately executing the application.

After displaying the payment related information, in step 1309, the callee terminal 120 detects a user input regarding the payment, and performs the payment procedure. Herein, the user input regarding the payment may indicate an input for proceeding with the payment procedure. For example, the callee terminal 120 may detect at least one of a touch input for a displayed payment button and a voice input directing to proceed with the payment. Also, for example, the callee terminal 120 may detect an input for the callee's payment information such as callee's card or account number, name, password.

As stated above, if detecting the payment related input, the callee terminal 120 performs the payment procedure. For example, the callee terminal 120 may transmit payment information to a payment server, and receive a corresponding payment complete message from the payment server.

After the payment procedure, in step 1311, the callee terminal 120 transmits a message of the payment complete to the caller terminal 110. In some embodiments, the payment complete message may be transmitted through the authentication procedure described in FIG. 7 through FIG. 11. For example, to authenticate that the payment complete message is transmitted from the callee terminal 120, the digital signature generated at the callee terminal 120 may be included in the payment complete message. Hence, by identifying the digital signature, the caller terminal 110 may identify that the payment complete message is generated and transmitted from the callee terminal 120.

In another embodiment, the payment complete message may be transmitted using a general communication path. For example, the callee terminal 120 may use the cellular communication network (e.g., LTE) or the wireless LAN (e.g., WiFi), to transmit the payment complete message.

After the payment complete message is transmitted from the callee terminal 120, in step 1313, the caller terminal 110 stores payment details. In some embodiments, the caller terminal 110 may store the payment details using a separate storage space. For example, the payment details may be stored in a designated space of the storage space of the caller terminal 110.

In other embodiments, the caller terminal 110 may request a payment server to store the payment details. In this case, the payment server may store the requested payment details according to a predefined classification criterion.

In addition, after the payment complete message is transmitted from the callee terminal 120, in step 1315, the callee terminal 120 may store digital signature information of the caller terminal 110. Herein, the digital signature of the caller terminal 110 may indicate the digital signature generated in the authentication process of step 1301. By storing the digital signature information of the caller terminal 110, the user of the callee terminal 120 may identify the payment with the caller terminal 110.

Details of storing the digital signature information of the caller terminal 110 are similar to the descriptions in step 1209 of FIG. 12, and accordingly are omitted here.

In FIG. 13, it has been described that the caller terminal 110 requests the payment and transmits the payment related information to the callee terminal 120. However, according to various embodiments, the callee terminal 120 may request the payment and transmit the payment related information to the caller terminal 110. For example, by inversely using the procedure described in FIG. 13, the callee terminal 120 may request the payment requiring the authentication on the callee of the call from the caller terminal 110.

In the above-stated various embodiments, the server authenticates the caller, using the PKI based authentication procedure. Namely, the caller is authenticated based on the cryptography using the public key and the private key and the digital signature. However, according to other embodiment, the server may authenticate the caller through a password instead of the cryptography using the public key and the private key and the digital signature. In this case, the server may perform the authentication procedure on the caller whose account is registered in advance. Using the account, the server may provide the service to callers authenticated with the password for the account. In addition, the server transmits call information of the callers authenticated with the password to the callee and thus guarantees that the caller of the transmitted call information is authenticated.

The methods according to the embodiments described in the claims or the specification of the present disclosure may be implemented in hardware, software, or a combination of hardware and software.

For the software implementation, a computer-readable storage medium which stores one or more programs (software modules) may be provided. One or more programs stored in the computer-readable storage medium may be configured for execution by one or more processors of an electronic device. One or more programs may include instructions for enabling the electronic device to execute the methods according to the embodiments described in the claims or the specification of the present disclosure.

Such a program (software module, software) may be stored to a random access memory, a non-volatile memory including a flash memory, a ROM, an EEPROM, a magnetic disc storage device, a compact disc (CD)-ROM, digital versatile discs (DVDs) or other optical storage devices, and a magnetic cassette. Alternatively, the programs may be stored to a memory combining part or all of them. Also, a plurality of memories may be included.

Also, the programs may be stored in an attachable storage device accessible via a communication network such as Internet, Intranet, LAN, wide LAN (WLAN), or storage area network (SAN), or a communication network by combining these networks. Such a storage device may access an apparatus which realizes an embodiment of the present disclosure through an external port. Also, a separate storage device on the communication network may access the apparatus which realizes an embodiment of the present disclosure.

In the specific embodiments of the present disclosure as described above, the elements included in the disclosure are expressed in a singular or plural form. However, the singular or plural expression is appropriately selected according to a proposed situation for the convenience of explanations, the present disclosure is not limited to a single element or a plurality of elements, the elements expressed in the plural form may be configured as a single element, and the elements expressed in the singular form may be configured as a plurality of elements.

Meanwhile, the detailed description of the present disclosure has been described with reference to certain embodiments thereof, but various modifications may be made without departing from the scope of this disclosure. Therefore, the scope of this disclosure should not be limited to the described embodiments but should be defined by the claims as below and their equivalents within the scope of the claims.

What is claimed is:

1. A method for operating a terminal in a communication system, the method comprising:
generating an identifier for a specific combination among a plurality of combinations of an outgoing number of the terminal and an incoming number of an other terminal;
generating call information corresponding to the identifier, wherein the call information comprises information requiring caller authentication and payment related information;
digesting the call information using a cryptographic hash function;
generating a digital signature by encrypting the digested call information with a private key of the terminal;
encrypting the digested call information using a public key of a server that is received from the server; and
transmitting, to the server, a message comprising the identifier, the digital signature, and the encrypted call information.

2. The method of claim 1, further comprising:
transmitting, to the other terminal, an outgoing call; and
after transmitting the outgoing call, establishing an encrypted channel among the terminal, the other terminal, and the server, based on the identifier,
wherein the message comprising the identifier, the digital signature, and the encrypted call information is delivered over the encrypted channel.

3. The method of claim 1, further comprising:
encrypting other information corresponding to the identifier; and
transmitting the encrypted other information to the other terminal,
wherein the other information comprises at least one of information requiring caller authentication or payment related information.

4. The method of claim 1, wherein the outgoing number of the terminal comprises a mobile identification number (MIN) for a user of the terminal.

5. The method of claim 1, wherein the incoming number regarding the other terminal comprises a mobile identification number (MIN) for a user of the other terminal.

6. The method of claim 1, wherein the call information further comprises information regarding at least one of authentication on the outgoing number of the terminal, or a user and an institution which uses the terminal.

7. A method for operating a server in a communication system, the method comprising:
receiving, from a terminal, a message comprising an identifier, encrypted call information, and a digital signature, wherein the identifier is generated for a specific combination among a plurality of combinations of an outgoing number of the terminal and an incoming number of an other terminal, wherein the call information comprises information requiring caller authentication and payment related information, wherein the encrypted call information is encrypted using a public key of the server that was received by the terminal from the server, and wherein the digital signature was generated with a private key of the terminal;
decrypting the call information, wherein the call information was digested by the terminal using a cryptographic hash function for generating the digital signature;
identifying the digital signature using a public key of the terminal; and
transmitting, to the other terminal, a message comprising the decrypted call information and the digital signature.

8. The method of claim 7,
wherein the encrypted call information comprises call information by encrypting information corresponding to the identifier generated based on an identification number regarding the terminal and an identification number regarding the other terminal using the public key of the server, and
wherein the digital signature comprises a digital signature generated using the private key of the terminal.

9. The method of claim 7, further comprising:
transmitting, to the other terminal, a message for notifying that authenticated call information is stored in the server.

10. The method of claim 7, wherein the outgoing number of the terminal comprises a mobile identification number (MIN) for a user of the terminal.

11. The method of claim 7, wherein the incoming number of the other terminal comprises a mobile identification number (MIN) for a user of the other terminal.

12. The method of claim 7, wherein the call information further comprises information regarding at least one of authentication on the incoming number of the terminal, or a user and an institution which uses the terminal.

\* \* \* \* \*